(12) United States Patent
Matousek et al.

(10) Patent No.: US 7,198,450 B2
(45) Date of Patent: Apr. 3, 2007

(54) UNLOADING SYSTEM FOR AN AGRICULTURAL COMBINE

(75) Inventors: Robert A. Matousek, Milan, IL (US); Jonathon E. Ricketts, Viola, IL (US); Joshua J. Wolters, Geneseo, IL (US); Dennis P. Silver, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 137 days.

(21) Appl. No.: 10/620,117

(22) Filed: Jul. 15, 2003

(65) Prior Publication Data

US 2005/0036868 A1    Feb. 17, 2005

(51) Int. Cl.
*B60P 1/00* (2006.01)
*B65F 1/00* (2006.01)
*B65G 33/32* (2006.01)
*A01D 17/02* (2006.01)

(52) U.S. Cl. ............... 414/523; 414/505; 414/526; 198/668

(58) Field of Classification Search ........... 414/523, 414/505, 526, 504; 198/668, 632, 313, 671; 56/14.6, 13.3; 366/68; 460/114, 119; 212/299; 52/116, 119

See application file for complete search history.

(56) References Cited

U.S. PATENT DOCUMENTS

| | | | |
|---|---|---|---|
| 880,303 A | 2/1908 | Hetherington | |
| 1,925,024 A | 8/1933 | Slater | |
| 2,590,183 A | 3/1952 | Keesling | |
| 2,730,256 A * | 1/1956 | Louden et al. | 414/505 |
| 3,339,758 A * | 9/1967 | Hubert et al. | 414/505 |
| 3,825,138 A * | 7/1974 | Pool | 414/505 |
| 4,372,440 A | 2/1983 | Ringis | |
| 4,408,947 A * | 10/1983 | Lenski et al. | 414/526 |
| 4,411,581 A | 10/1983 | Niewold | 414/489 |
| 4,765,190 A * | 8/1988 | Strubbe | 73/861.72 |
| 4,907,402 A * | 3/1990 | Pakosh | 56/14.6 |
| 5,029,436 A * | 7/1991 | Fredriksen et al. | 56/14.5 |
| 5,551,776 A * | 9/1996 | Zimmerman | 366/68 |
| 6,261,050 B1 * | 7/2001 | Kuhns | 414/526 |
| 6,361,435 B1 * | 3/2002 | Yamamoto et al. | 460/99 |
| 2002/0083695 A1 * | 7/2002 | Behnke et al. | 56/119 |

* cited by examiner

*Primary Examiner*—Kathy Matecki
*Assistant Examiner*—Gregory Adams
(74) *Attorney, Agent, or Firm*—Michael C. Harms; John William Stader; Stephen A. Bucchianeri

(57) ABSTRACT

An agricultural combine including an unloading system wherein an unloading conduit assembly is, in an operational set-up, rotatable or swivelable through an arc of 360° to permit grain unloading into a grain truck located at any point around the combine, whether the combine is stationary or moving. For road travel or storage the unloading conduit assembly, or some portion of it, is pivoted into a set-up wherein the longitudinal conduit is retracted into nesting relationship against the side of the combine and below the top of the grain tank.

15 Claims, 6 Drawing Sheets

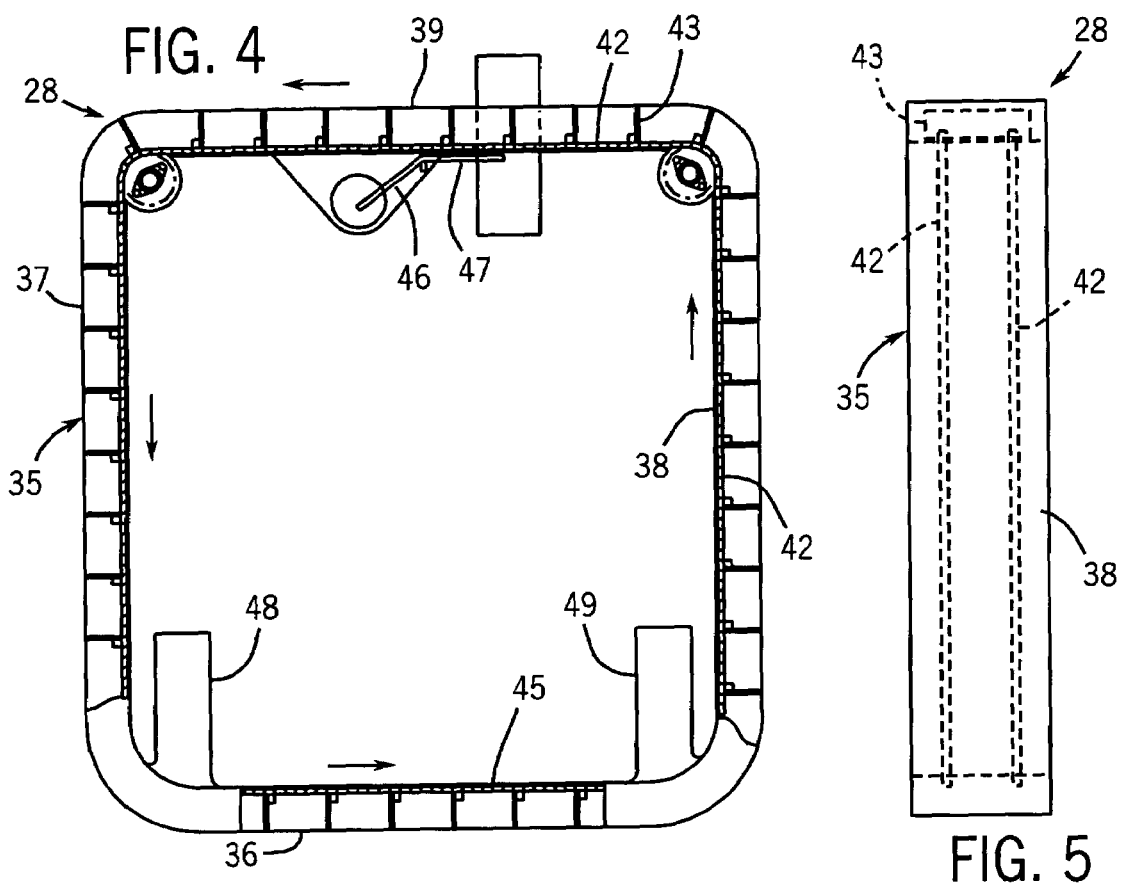
FIG. 4
FIG. 5
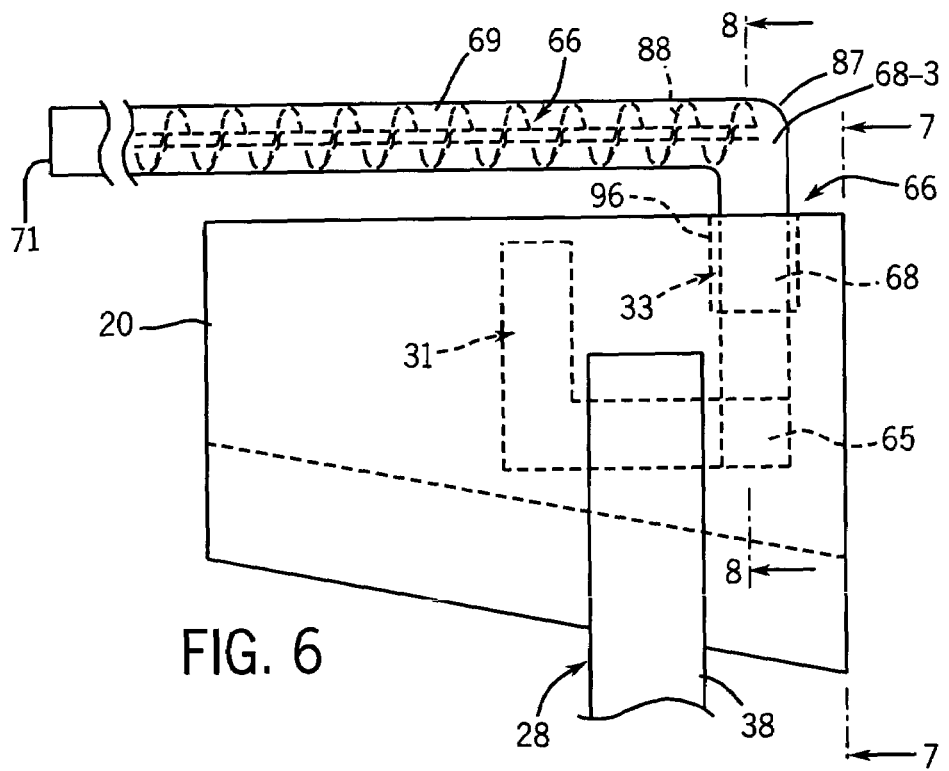
FIG. 6

UNLOADING SYSTEM FOR AN AGRICULTURAL COMBINE

FIELD OF THE INVENTION

This invention relates generally to agricultural crop harvesters. It relates particularly to agricultural crop harvesters such as combines and, more specifically, to a grain unloading system for a combine.

BACKGROUND OF THE INVENTION

It is conventional in combines to mount an unloading conduit on one side of the combine for swiveling movement outwardly of the combine. The inlet end of the conduit is connected to the grain tank of the combine. The outlet end of the conduit is open to permit the discharge of grain from the grain tank into a grain truck or wagon alongside the combine. A grain auger within the unloading conduit carries grain from the tank to the truck or wagon under control of the combine operator. In the alternative, the unloading conduit might contain a paddle conveyor to carry grain through it.

With a conventional unloading system, the combine can be unloaded only from one side (normally the left side) because the unloading conduit can only be swiveled outwardly from that one side to its unloading position. As a result, problems are frequently encountered in unloading grain because trucks or wagons cannot be maneuvered easily into place for receiving grain without damaging crop still in the ground. If the combine is maneuvered to avoid this, time is lost and operating expense is increased.

Combines with systems for unloading from both sides have been designed. Examples are seen in U.S. Pat. Nos. 4,907,402 and 3,339,758. None have proven successful, however, primarily because of increased costs associated with their manufacture and operation.

SUMMARY OF THE INVENTION

An object of the present invention to provide a new and improved combine unloading system.

Another object to provide a combine unloading system which facilitates unloading into a grain truck or the like positioned anywhere around the combine.

Still another object to provide an unloading system including a conduit assembly which, in an operational set-up, has a 360° range of travel around the combine.

A further object is to provide an unloading conduit assembly which has a non-operational, travel set-up wherein the horizontal unloading conduit is retracted.

A further object is to provide an unloading system including a conduit assembly of the aforedescribed character which is simple and economical to construct and operate.

A further object is to provide an agricultural combine including a new and improved unloading system.

The foregoing and other objects are realized in accord with the present invention by providing a combine with an unloading system including an unloading conduit assembly located in the center of the combine, at the front end of the grain tank. The unloading system includes a grain sump into which grain is deposited by a loop elevator assembly. The unloading conduit assembly includes a vertical grain conduit containing an auger extends upwardly from the sump to a point above the level of grain at its highest level in the tank. A horizontal grain conduit containing another auger is connected to the upper end of the vertical conduit.

The horizontal conduit is sufficiently long so that its discharge end extends outwardly of the rear end of the combine. It can be rotated through an arc of 360° around the combine so grain can be discharged at any selected location relative to the combine. A grain truck can be positioned easily to receive grain at any desirable location relative to the combine, whether the combine is moving or stationary.

According to a first embodiment of the invention, the vertical conduit includes a lower, fixed section which protrudes upwardly out of the sump. A short, intermediate section of the vertical conduit is mounted on the lower section by a ring joint which permits rotation or swiveling of the intermediate section about its common axis with the lower section, but otherwise fixes the intermediate section relative thereto.

The vertical conduit also includes an upper section which is fastened to the intermediate section at a horizontal pivot joint which permits the upper section to pivot into an attitude perpendicular to the intermediate and lower conduit sections. It is pivoted into this attitude when the unloading system is configured for travel, i.e. is in its travel set-up. It is pivoted into coaxial relationship with the lower and intermediate conduit sections (and locked in this relationship) when the unloading conduit assembly is in its operational set-up.

According to a second embodiment of the invention, the vertical conduit includes a lower section and an upper section connected by a ring joint which permits rotation or swiveling of the upper section about its common axis with the lower section. The lower section, as a whole, is mounted on the combine frame for pivotal movement about an axis which is perpendicular to, and offset to one side of, the aforementioned common axis. This permits the entire vertical conduit to be pivoted (tilted) from its vertical, operating position to a nearly horizontal, traveling position. A horizontal conduit is connected to the upper end of the vertical conduit in a manner similar to the first embodiment hereinbefore described.

BRIEF DESCRIPTION OF THE DRAWINGS

The invention, including its construction and method of operation, is illustrated more or less diagrammatically in the drawings, in which:

FIG. 4 is a front elevational view of the loop conveyor assembly in the combine;

FIG. 5 is a side elevational view of the loop conveyor assembly seen in FIG. 4;

FIG. 6 is an enlarged, side elevational view of the grain tank with an unloading system comprising a first embodiment in its operational set-up;

DESCRIPTION OF THE PREFERRED EMBODIMENT

Figure 1:
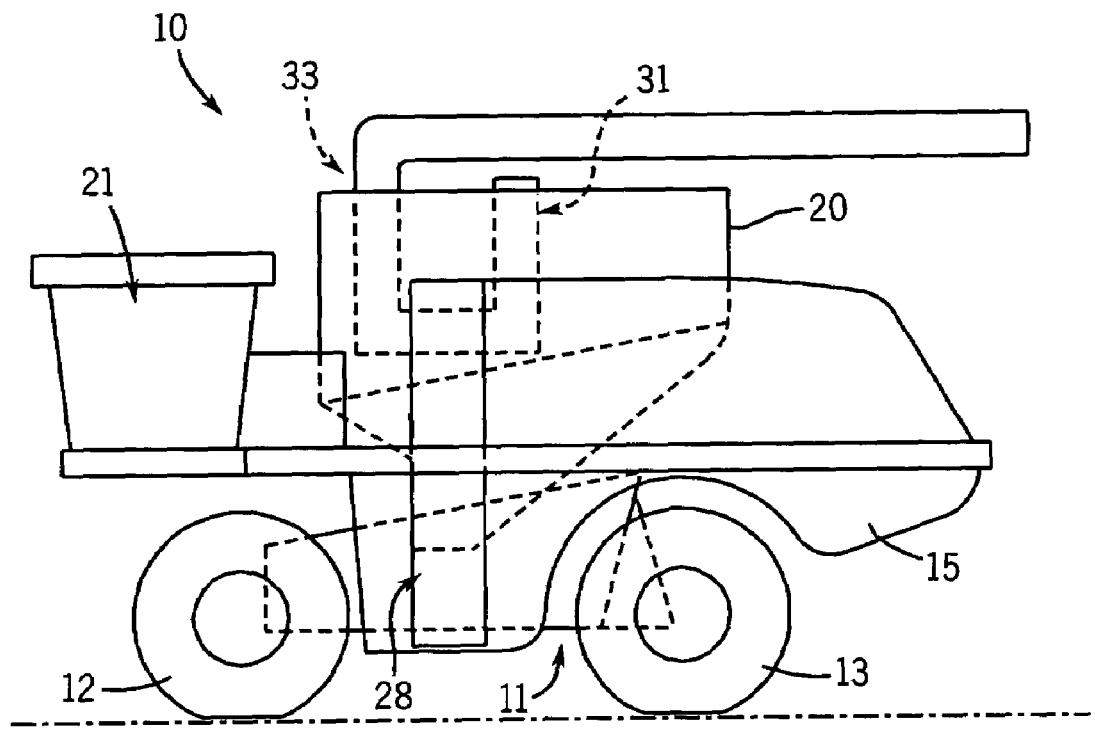
FIG. 1 is a side elevational view of a combine incorporating an unloading system embodying features of a first embodiment of the present invention, with its loading conduit assembly in an operational set-up.
Figure 3:
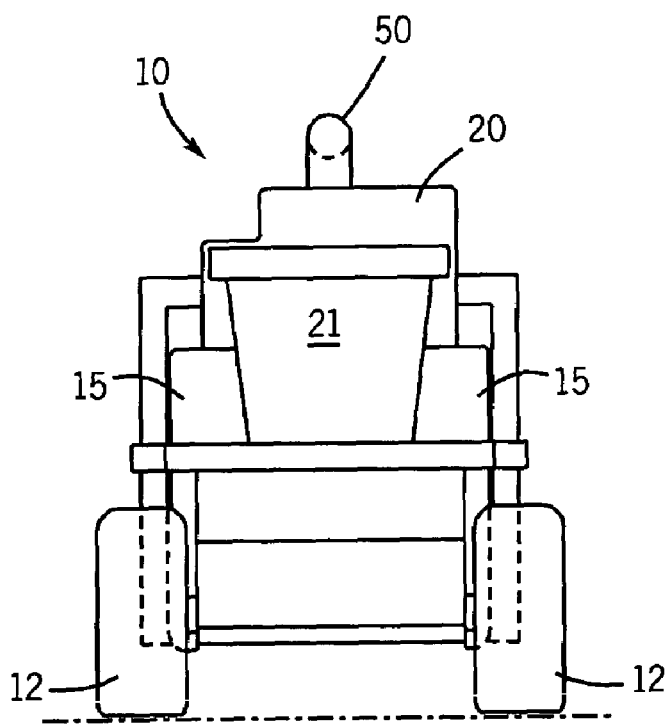
FIG. 3 is a front view of the combine and unloading system seen in FIGS. 1 and 2, with parts removed.
Figure 2:
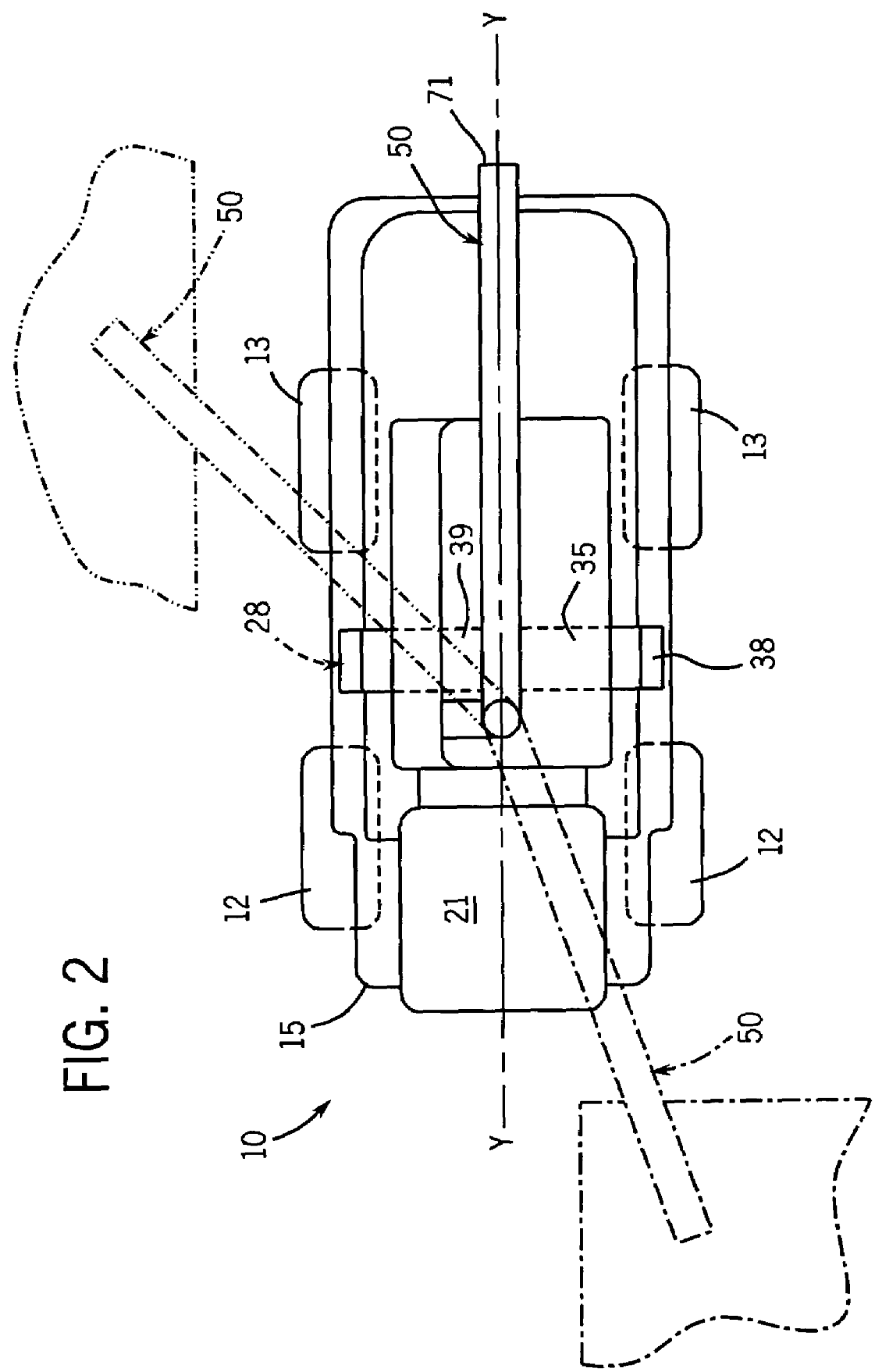
FIG. 2 is a top plan view of the combine and unloading system seen in FIG. 1.

Referring now to the drawings, and particularly to FIGS. 1–3, a self-propelled, rotary combine is seen generally at 10. The combine 10 includes a chassis 11 supported by two front wheels 12 and two rear wheels 13.

The chassis 11 supports a body 15 containing an engine (not shown) which supplies power to the wheels 12 and 13, all of which are driven and steered in a manner which forms no part of the present invention. Also inside the body 15, supported by the chassis 11, is a rotary axial threshing assembly (not shown) driven from the internal combustion engine.

Above the threshing assembly, within the body 15 and extending upwardly out of the body, is a grain tank 20. In front of the body 15, adjacent the grain tank 20, is an operator's cab 21. The cab 21 is also supported from the chassis 11.

The combine 10 includes a crop harvesting header assembly (not shown). The header assembly is connected to the front end of the chassis 11 by a harvested crop feeder assembly (not shown). As the combine 10 moves through a crop of grain, for example, the header assembly harvests the standing grain and delivers it to the feeder assembly, which feeds it to the rotary threshing assembly.

The rotary threshing assembly threshes the grain from its stalks and the separated grain falls onto a grain pan and, from thence, onto a sieve assembly (not shown). The grain which passes through the sieve assembly falls into a loop elevator assembly 28 and is elevated into the tank 20. The straw and chaff which remain after threshing are blown out of the rear of the combine body 15.

The loop elevator assembly 28 extends upwardly and, then, through the tank 20, transversely of the combine body 15. The loop elevator assembly 28 delivers grain to either a grain bubbler assembly 31 or an unloading conduit assembly 33. When the unloading assembly 33 is operating to unload grain, the grain delivered by the loop elevator assembly 28 goes directly into the unloading conduit assembly 33. When the unloading conduit assembly 33 is not operating, the elevator assembly 28 diverts grain into the bubbler assembly 31, which "bubbles" the grain upwardly into the tank 20 at a level generally corresponding to the top of the tank.

Referring now also to FIGS. 4 and 5, the loop elevator assembly 28 includes a rectangular cross-section conduit 35 having a bottom section 36 which extends below the grain pan. Side sections 37 and 38 extend up each side of the grain tank 20. A top section 39 of the conduit 35 extends transversely through the grain tank 20. The loop elevator conduit 35 contains an endless conveyor comprising a carrier chain 42 and a series of conveyor paddles 43 mounted on the chain.

Grain from the rotary threshing assembly is collected continuously by the elevator assembly 28 through an elongated opening 45 in the upper surface of the bottom section 36 in the conduit 35. This grain is carried up one side section 38 of the conduit 35 to the top section 39. Grain in the top section 39 of the conduit 35 is selectively permitted to fall either into the bubbler assembly 31 (see FIG. 1) or the unloading conduit assembly 33, in a manner hereinafter discussed. The conveyor paddles 43 then continue endlessly down the side section 38 of the conduit 35 to collect and carry more grain on its next circumlocution of the conduit 35.

As previously pointed out, when the combine 10 is unloading grain the grain elevated by the loop elevator assembly 28 is being directed into the unloading conduit assembly 33. This is accomplished by operator control of a pair of doors 46 and 47 in the bottom wall of the top conduit section 39. When the door 46 is open, the door 47 is closed, and visa-versa. Opening of the door 46 by the operator directs grain to the unloading conduit assembly 33, while opening of the door 47 directs grain to the bubbler assembly 31.

Since the construction and operation of the bubbler assembly 31, as well as the cooperation of the grain tank 20 end loop conveyor assembly 28, form no part of the present invention, they are not discussed in detail here. However, a general explanation of the manner in which they cooperate is desirable in order to insure a thorough understanding of the invention.

To repeat, when the combiner 10 is unloading grain, all grain elevated by the loop conveyor 28 is directed into the unloading conduit assembly 33. When unloading is not taking place, however, and harvesting continues, grain is directed into the bubbler assembly 31 and, from there, bubbled into the grain tank 20. The tank 20 may be filled in this way.

To unload from the tank 20, the grain tank is provided with a pair of bottom outlets (not shown) which overlay a corresponding pair of drop chutes 48 and 49 bracketing the opening 45 in the bottom section 36 of the conveyor conduit 35. Grain from the tank 20 is metered continuously into this bottom section 36 through these drop chutes 48 and 49, under control of the operator. This grain is then elevated by the loop elevator assembly 28 and directed into the unloading conduit assembly 33.

Figure 9:
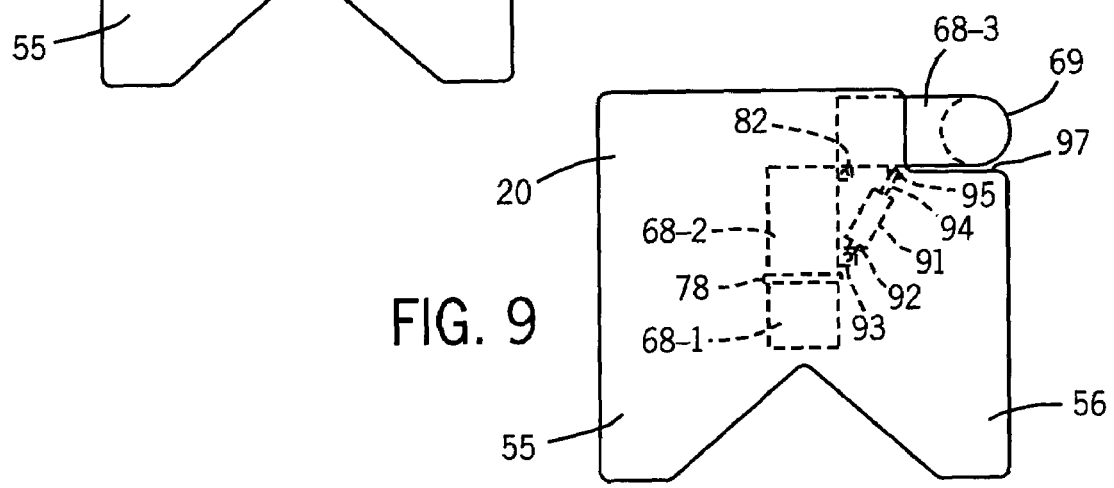
FIG. 9 is a view similar to FIG. 7, but with the unloading conduit assembly in its stored or traveling set-up.
Figure 10:
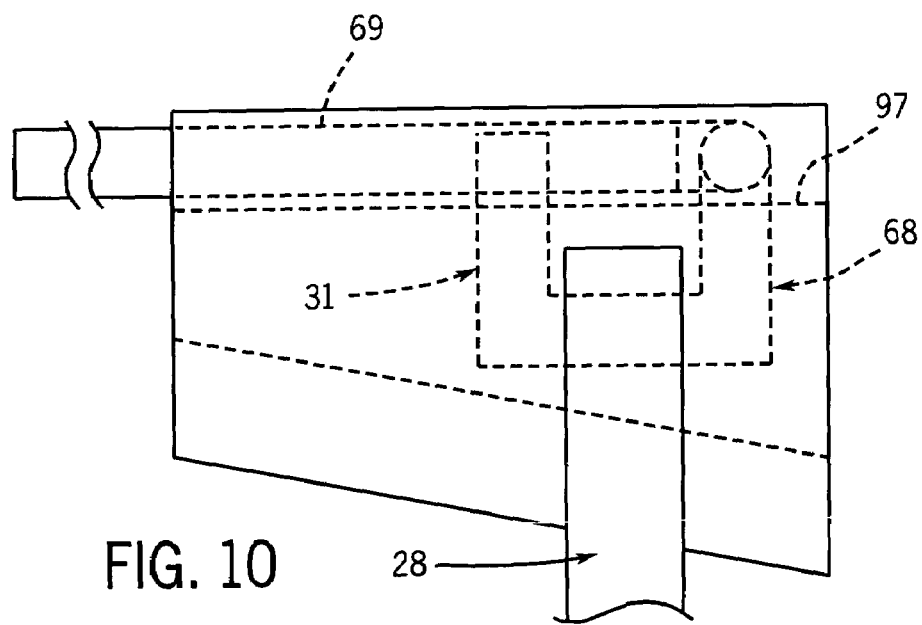
FIG. 10 is a side elevational view, similar to FIG. 6, with the unloading conduit assembly in stored or traveling set-up.

Referring now to FIGS. 6–10, the unloading conduit assembly 33 is shown in an operational set-up (FIGS. 6–8) and in a storage or transport set-up (FIGS. 9, 10). In its operational set-up, the unloading conduit assembly 33 can unload grain into a truck moving with the combine 10 at any point around the 360° circumference of the combine. In its storage or transport set-up, the unloading conduit assembly 33 is folded into a retracted on one side of the grain tank 20 and combine body 15, where it can encounter no obstructions and exceed no legal height limits during travel of the combine 10.

Figure 7:
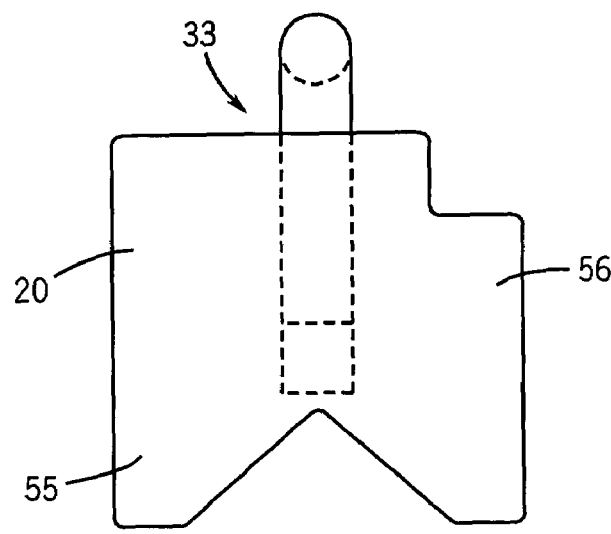
FIG. 7 is a view taken along line 7—7 of FIG. 6.

As seen best in FIGS. 7 and 9, the grain tank 20 is generally saddle-shaped in front view. This configuration permits it to nest over the axial rotor assembly. Since the rotary threshing assembly is inclined upwardly, from front to back, in a conventional manner, each side (right) 55 and (left) 56 of the tank has a bottom which is inclined upwardly in the same way.

Grain fed into the tank 20 from the loop elevator assembly 28 through the bubbler assembly 31 falls into both sides 55 and 56 of the tank 20. Grain which accumulates in the tank 20 flows toward the front end 58 of the tank because of the incline of the tank bottoms. On command of the operator, it can them be recycled into the loop conveyor or assembly 28 in a manner previously discussed.

The unloading conduit assembly 33 is mounted in the grain tank 20 adjacent the front end 58 of the tank. The unloading conduit assembly 33 includes a sump 65 which supports an unloading conduit 66. The unloading conduit 66 includes a vertical conduit 68 and a horizontal conduit 69. According to the invention, the unloading conduit 66 is rotatable about the vertical axis of the vertical conduit 68 to swing the discharge end 71 of the horizontal conduit 69 over a grain truck positioned at any desirable spot around the combine 10, whether the combine is moving or stationary.

The sump 65 receives grain from the loop conveyor assembly 28 in a manner hereinbefore discussed. Grain in the sump 65 then conveyed out through the conduit 66 to a grain truck.

Figure 8:
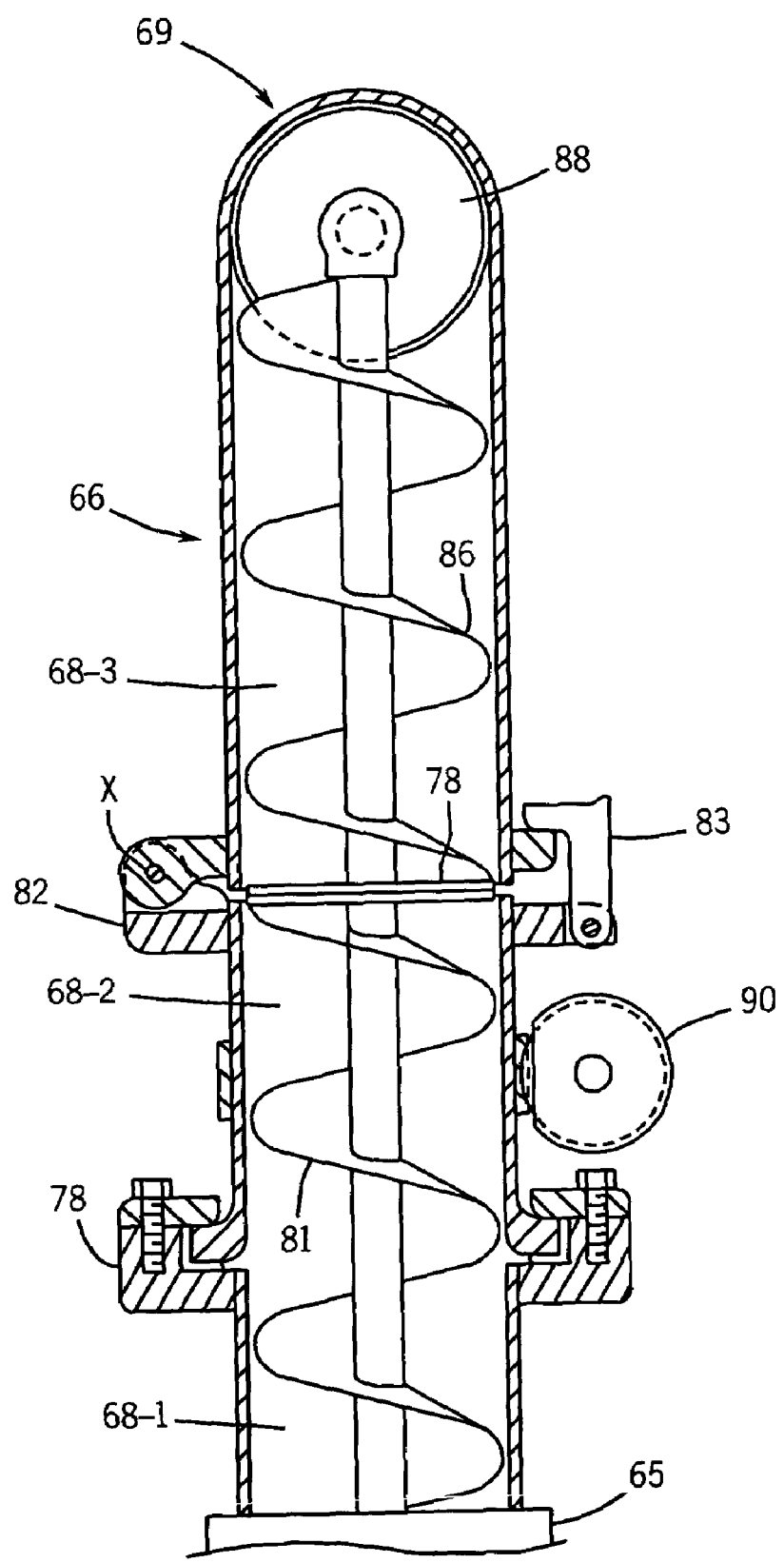
FIG. 8 is a further enlarged vertical sectional view taken through the vertical conduit of the unloading conduit assembly of the first embodiment in its operational set-up.

Referring now to FIG. 8, as well as FIGS. 6 and 7, the vertical conduit 68 of the unloading conduit 66 comprises three vertical sections 68-1, 68-2 and 68-3. The lower section 68-1 is rigidly mounted on the sump housing 65. The middle section 68-2 is mounted in a swivel joint 78, on the lower section 68-1, for rotational movement relative to the lower section 68-1 about their common axis. A vertical auger element 81 extends through both sections 68-1 and 68-2 and is driven in a conventional manner from its lower end.

The upper vertical conduit section 68-3 is connected to the intermediate section 68-2 by a hinge joint 82. The hinge joint 82 permits the upper vertical conduit section 68-3 to pivot about the horizontal axis X of the joint 82 when a latch mechanism 83 opposite the hinge joint 82 is released.

The hinge joint axis X extends parallel to the longitudinal axis Y of the combine 10 (see FIG. 2). According to the invention, this permits the upper conduit section 68-3 to pivot directly sideways relative to the combine chassis 11 when the latch mechanism 83 is released, and the conduit 69 is aligned with the chassis, as will hereinafter be discussed.

The vertical conduit section 68-3 contains a vertical auger element 86. The auger element 86 meshes with the auger element 81 at their respective lower and upper ends in a conventional manner when the conduit section 68-3 is latched in place, whereby rotation of the auger element 81 produces corresponding rotation of the auger element 86.

The upper end of the vertical conduit section 68-3 is joined by an elbow joint 87 (see FIG. 6) to the horizontal conduit 69. The horizontal conduit 69 contains a horizontal auger element 88 which extends the length of the conduit and is driven in a conventional manner by a bevel gear arrangement (not shown) in the elbow joint 87, which connects it to the auger element 86.

The height of the vertical conduit 68, with its sections 68-1, 68-2 and 68-3 in operational relationship, is such that the horizontal auger conduit 69 will pass over the top of a full load of grain in the grain tank 20 (and the top of bubbler assembly 31) when the conduit 69 is rotated or swiveled from side-to-side of the combine 10 for unloading on either side. In this operational set-up, the horizontal conduit 69 and sections 68-3 and 68-2 of the vertical conduit 68 rotate in the swivel joint 78 under the influence of an operator-controlled hydraulic motor 90. The operator selectively activates the motor 90 to accomplish this end. Moving the conduit 69 to either right or left so as to permit unloading grain into a grain truck positioned virtually anywhere around the combine 10 is easily accomplished, with the combine moving or stationary.

When the combine 10 must be configured or set-up for road travel, for example, the horizontal conduit 69 is rotated into centered relationship over the grain tank 20. The operator then releases the latch mechanism 83, which may be done from inside the cab 21. The upper section 68-3 of the vertical conduit 68 and the conduit 69 are then free to pivot about the hinge joint 82 into the relationship shown in FIGS. 9 and 10.

Referring to FIG. 9, this is accomplished by actuating the hydraulic control motor 91. The motor 91 is pivotally connected at its base 92 to a flange 93 extending outwardly from the vertical conduit section 68-2 near the swivel joint 78. A motor piston 94 is pivotally connected, at its free end, to a flange 95 extending outwardly from the vertical conduit section 68-3. The motor 91 can be actuated to retract the conduit 69 into the position shown in FIG. 9, or extend it into the position shown in FIG. 7. A hinged door 96 in the upper-left side of the tank 20 (see FIG. 6) is opened to permit the upper vertical conduit section 68-3 to pass therethrough.

As best seen in FIG. 9, the grain tank 20 has a longitudinally elongated shelf 97 formed into its left side (the combine operator's left). The horizontal conduit 69 nests in this shelf 97 when it is retracted for road travel or storage. When retracted in this manner, the conduit 69 is locked in place and the combine 10 can be safely driven on roads while complying with all local height regulations, for example.

Figure 11:
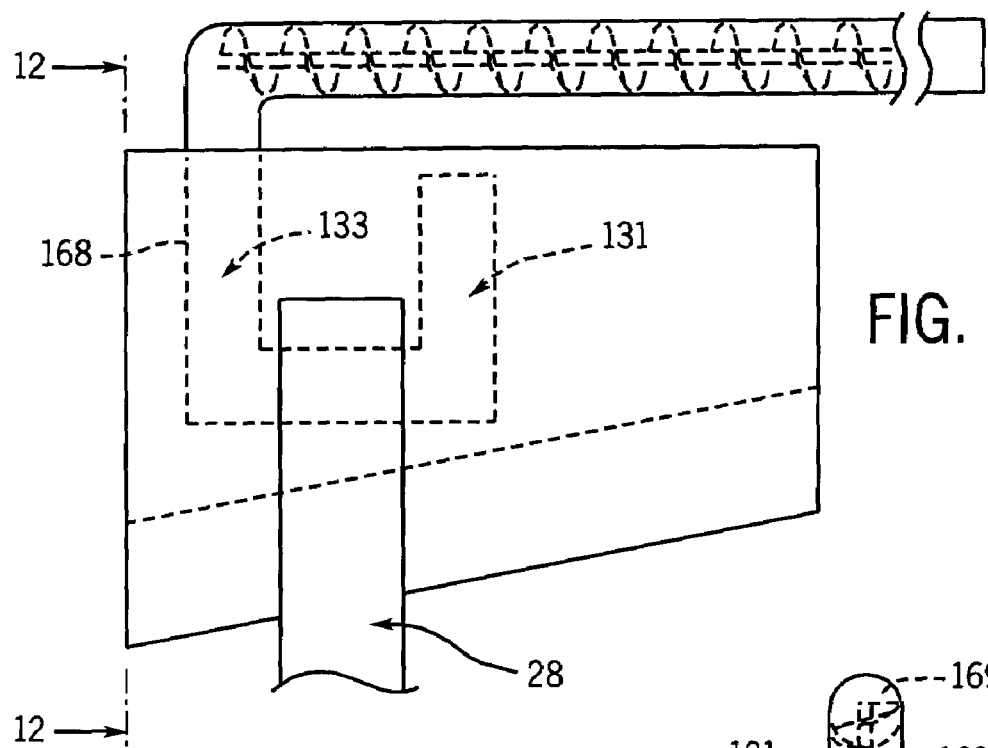
FIG. 11 is an enlarged, side elevational view of a portion of a combine incorporating a second embodiment of the unloading system of the invention.
Figure 12:
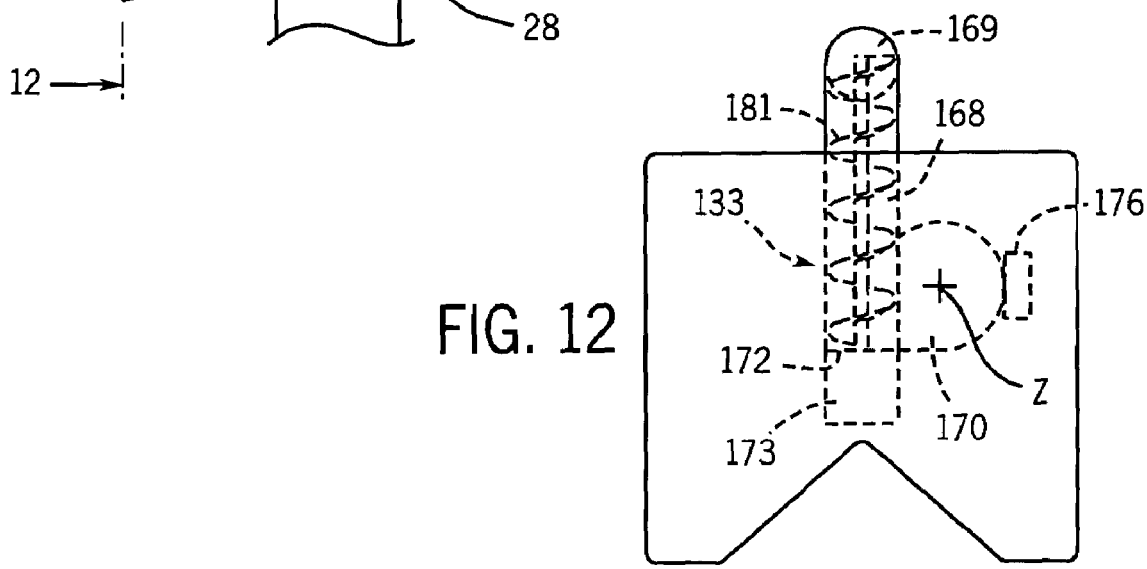
FIG. 12 is a view taken along line 12—12 of FIG. 11 (with the unloading conduit assembly in operational set-up)
Figure 13:
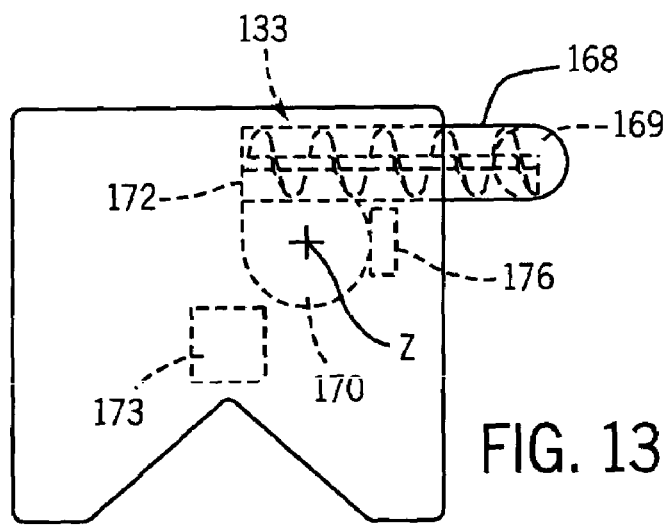
FIG. 13 is a view similar to FIG. 12, showing the unloading conduit assembly of the second embodiment in its stored or travelling set-up.

Turning now to FIGS. 11–13, a second embodiment of the unloading conduit assembly is seen generally at 133. The unloading conduit assembly 133 is similar in construction and operation to the unloading conduit assembly 33 hereinbefore described, except that its vertical conduit 168 is not hinged at mid-point but, in the alternative, pivots as a whole about a longitudinal axis Z on the combine 10 located in a foot section 170 of the vertical conduit. This allows the horizontal conduit 169 to be pivoted into transport position without creating a break in the vertical conduit 168 or its auger element 181.

FIG. 12 shows the unloading conduit assembly 133 in its operating set-up. As will be seen, the vertical conduit 168 supports the horizontal conduit directly above the combine 10, facilitating rotation of the horizontal conduit in a 360° arc around the combine for unloading purposes.

When the combine 10 must be moved over a highway, for example, the entire vertical conduit 168 is rotated about the axis Z so that its lower end 172 separates from the sump 173 and the horizontal conduit 169 is laid-over on its side into a transport position. To this end, a suitable hydraulic actuator 176 connected between the foot section 170 and the chassis 11 of the combine 10 may be utilized to accomplish this conversion to a travel set-up under the control of the combine operator.

The present invention is capable of being incorporated in a variety of embodiments, only two of which have been described. The invention may be embodied in other forms without departing from its spirit or essential characteristics. The described embodiments are to be considered only as illustrative and not restrictive and the scope of the invention is, therefore, indicated by the appended claims rather than by the foregoing description. All variations which come within the meaning and scope of the claims, including the full range of equivalency to which they are entitled, are intended to be embraced within their scope.

We claim:

1. A system for unloading grain from a grain tank of an agricultural combine, comprising:
    a) an unloading conduit assembly for unloading grain from the combine into a grain truck displaced horizontally from the grain tank, the combine having a longitudinal axis parallel with a combine direction of travel;
    b) said unloading conduit assembly including a vertical conduit and a horizontal conduit mounted on top of said vertical conduit, said horizontal conduit having an extent greater than an extent of said vertical conduit;

c) said vertical conduit being mounted on the combine for rotational movement of at least a portion of the vertical conduit about its vertical axis;

d) said vertical conduit also being mounted on the combine for sideways pivoting of at least a first portion of the vertical conduit about a horizontal pivot axis to permit retracting said horizontal conduit into a storage position, wherein the horizontal pivot axis is parallel to the longitudinal axis of the combine and the horizontal conduit extends along the longitudinal axis; and e) said unloading conduit assembly configured to unload grain through the horizontal conduit to the grain truck located anywhere along an entire radial circumference of the unloading assembly relative to the vertical axis of the vertical conduit.

2. The unloading system of claim 1 further characterized in that:

a) said vertical conduit having a length extending from at least a top of the grain tank and mounted on the combine for rotation of the entire vertical conduit about said vertical axis.

3. The unloading system of claim 2 further characterized in that:

a) said vertical conduit is mounted on the combine for sideways pivoting of the entire vertical conduit about said horizontal pivot axis.

4. The unloading system of claim 1, further comprising: an auger located in said horizontal conduit.

5. The unloading system of claim 1, further comprising: a hinge joint pivotally coupling the first portion of the vertical conduit to a remaining portion of the vertical conduit.

6. The unloading system of claim 5, further comprising: a latch mechanism fixedly attached to the first portion of the vertical conduit, the latch mechanism configured to releasably attach the remaining portion of the vertical conduit to the first portion of the vertical conduit thereby allowing the remaining portion of the vertical conduit to pivot on the hinge joint about the horizontal pivot axis when the latch mechanism is released.

7. The unloading system of claim 1, wherein said horizontal conduit is retractable into an inoperative, stored position rested on a shelf formed into a left or right side of the grain tank of said combine relative to a direction of travel of the combine.

8. The unloading system of claim 7, wherein the shelf is formed into a left or right side of the grain tank relative to the direction of travel of the combine.

9. The unloading system of claim 1, further characterized in that said vertical conduit having a length extending from at least a top of the grain tank and mounted on the combine for rotation of the entire vertical conduit about said vertical axis.

10. A system for unloading harvested product from an agricultural combine, comprising:

a) an unloading conduit assembly for unloading product into a truck located on any radius horizontally around the combine;

b) said unloading conduit assembly including a vertical conduit extending upwardly out of the top of a storage tank and a horizontal conduit extending radially from said vertical conduit, said horizontal conduit having an extent greater than an extent of said vertical conduit, said vertical conduit includes a lower section, an intermediate section and an upper section, said intermediate and upper sections being rotatable relative to said lower section about an axis common to said upper section, said intermediate section, and said lower section, wherein said upper section is mounted on said intermediate section movement;

c) said vertical conduit being mounted in the tank for sideways pivoting of at said upper portion of the vertical conduit for pivoting about a horizontal pivot axis to permit retracting said horizontal conduit into a storage position rested on top of the grain tank of the combine.

11. The unloading system of claim 10 further characterized in that:

a) said vertical conduit is pivotable in its entirety about said horizontal pivot axis.

12. The system of claim 10, wherein said horizontal conduit in the storage position rests on a shelf formed into a left or right side of the grain tank of the combine relative to a forward direction of travel of the combine.

13. The unloading system of claim 12, further comprising:

a hinge joint pivotally coupling the upper section of the vertical conduit to portion the intermediate section of the vertical conduit, wherein a length of the vertical conduit extends at least to the grain tank.

14. The system of claim 10, further comprising:

an auger located in said horizontal conduit.

15. An agricultural combine including a threshing assembly for supplying grain to a grain tank and a system for unloading grain from said combine, the system comprising:

a) a loop conveyor assembly for conveying grain from said threshing assembly to an unloading conduit assembly;

b) said unloading conduit assembly including an unloading conduit, said unloading conduit includes a vertical conduit extending upwardly out of the top of a storage tank and a horizontal conduit extending radially from said vertical conduit, said unloading conduit configured to receive grain from said loop conveyor and convey the grain to a truck or the like located at any radial position around a perimeter of the combine relative to a vertical axis of the vertical conduit, said vertical conduit being mounted in the grain tank for sideways pivoting of at least a portion of the vertical conduit about a horizontal pivot axis to permit retracting said horizontal conduit into a storage position below the level of the top of the grain tank;

c) and said horizontal conduit is rested on a left or right side of the grain tank relative to a forward direction of travel of said combine.

* * * * *